Figure 1:
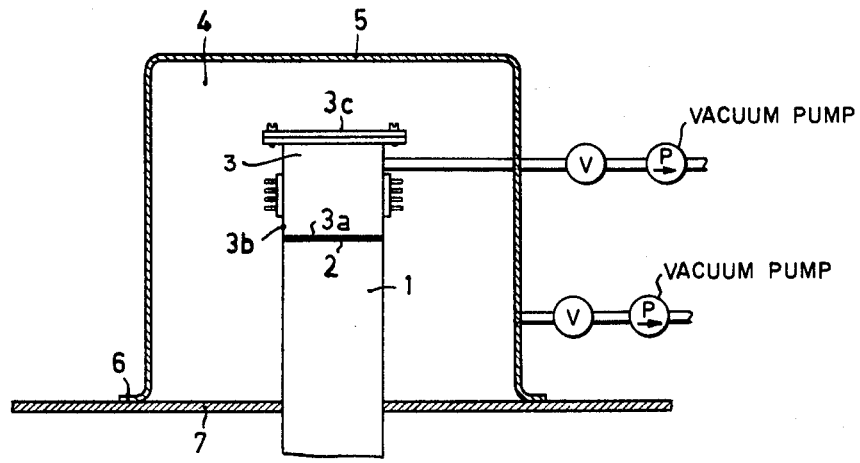

March 1, 1966  A. VENEMA  3,237,419

METHOD AND DEVICE FOR ATTAINING VERY LOW PRESSURE

Filed Jan. 31, 1964

INVENTOR.
ALBERTUS VENEMA
BY
AGENT

United States Patent Office 3,237,419
Patented Mar. 1, 1966

3,237,419
METHOD AND DEVICE FOR ATTAINING
VERY LOW PRESSURE
Albertus Venema, Emmasingel, Eindhoven, Netherlands, assignor to North American Philips Company, Inc., New York, N.Y., a corporation of Delaware
Filed Jan. 31, 1964, Ser. No. 341,685
Claims priority, application Netherlands, Feb. 15, 1963, 289,046
3 Claims. (Cl. 62—56)

In order to obtain very low pressures use is made of pumps, for instance diffusion pumps, getter-ion pumps and molecular pumps. If extremely low pressures are desired, a drastic degassing process is often carried at a high temperature.

With these known methods the obtainment of high vacuum takes much time. Periods of one to three days are normal.

Use has also been made of cooling of the space to be evacuated, to which end containers of fluid nitrogen, hydrogen or helium were employed, which containers are arranged on the wall or nearer the centre of the system to be evacuated. The period of degassing can thus be reduced, but handling such containers is inconvenient.

The measure of penetration and description of gases, which factors determine the extent of disengagement of gases in a system and hence also the pressures in the system, is found to be an exponential function of the absolute temperature.

The invention has for its object to provide a method and a device, by which very low pressures can be obtained within a considerably shorter time in a convenient manner.

In accordance with the invention the space to be exhausted is brought into thermal contact with the wall of the expansion space of cold-gas refrigerator and the space is degassed at the low temperature which said wall assumes during the operation of the cold-gas refrigerator, whilst a chamber surrounding the space to be degassed is also degassed. The pressure in said chamber is reduced for example to $10^{-4}$ Torr. The pressure in the space to be exhausted can be reduced to lower values, for example $10^{-9}$ Torr.

The term "cold-gas refrigerator" is to denote here a driven reciprocating machine comprising a first space of variable volume, communicating with a second space also of variable volume and having, during the operation of the machine, a higher temperature than the first space, whilst the junction between the said two spaces includes a regenerator and a gaseous working medium can flow to and fro between the spaces through the regenerator for transferring heat from a lower temperature level to a higher temperature level.

In an important embodiment of the invention a characteristic property of the cold-gas refrigerator is employed.

In this embodiment the cold-gas refrigerator is first driven for some time as a heat pump and the space and the walls thereof are heated during the degassing process, after which the cold-gas refrigerator is driven as a source of cold and the space is further degassed.

A device according to the invention for obtaining very low pressures is provided in known manner with a space to be exhausted and means for cooling said space.

In accordance with the invention the space is arranged in thermal contact on the wall of the expansion space of a cold-gas refrigerator and the space is surrounded by a chamber which can be caused to communicate with a vacuum pump.

The cold-gas refrigerator is preferably of the convertible type, so that it can operate as a heat pump. The wall of the expansion space then becomes hot and the space to be exhausted can be degassed.

One embodiment of the device according to the invention will be described more fully with reference to a diagrammatic drawing, whilst a possible method according to the invention will be explained.

The drawing shows an embodiment in

Figure 2:
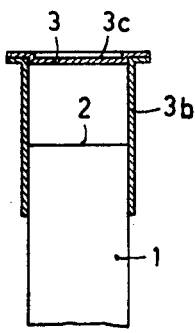

FIG. 1 in a longitudinal sectional view of the part of the device which is essential for this invention and FIG. 2 a longitudinal sectional view of a variant of the contact between the space to be exhausted and the cold wall of the cold-gas refrigerator.

Reference numeral 1 designates the head of the cold-gas refrigerator, the wall 2 of which particularly can assume a very low temperature in operation. A temperature of the order of 80° K. to 15° K. may be concerned here. The space 3 to be exhausted in accordance with the invention is in thermal contact with the wall 2 and/or 1. It is shown in FIG. 1 that the bottom $3a$ of the space 3 is intimately connected with the wall 2. FIG. 2 illustrates how the wall $3b$ of the space 3 can be slipped on the wall of the cold head and secured thereto in intimate contact. Securing may be obtained by soldering. The wall of the space 3 may be made of copper.

As shown in FIG. 1, the space 3 is closed on the upper side in a gas-tight manner by means of a lid $3c$ with stuffing material. The wall $3b$ of the space 3 is provided with passages for the connection of measuring instruments and a pump, for example a diffusion pump and/or getter-ion pump.

Substances having a large absorbing surface, for example zeolite or alumina, may be used, if desired in conjunction with the pump, for degassing the space 3.

The head 1, 2 and the space 3 with the ancillary parts are surrounded by a chamber 4 formed by a bell 5, which is arranged in intimate contact at 6 on a wall 7. The bell communicates with a vacuum pump, so that the chamber 4 can be exhausted to a pressure of, for example, $10^{-4}$ Torr. This is very useful to minimize the trouble caused by water, nitrogen, oxygen and helium during the evacuation of the chamber 4.

Thus condensation of water and gases on the head of the cold-gas refrigerator and the outer walls of the space 3 can be avoided. Moreover, the seal between the lid and the wall of the space 3 need not fulfill excessively severe requirements.

When the head of the cold-gas refrigerator assumes a temperature of about 80° K. in operation, it has been found to be possible to obtain a vacuum of less than $10^{-9}$ Torr. in the space 3 within about two hours.

Even more favourable results, particularly with respect to the vacuum, are obtained by first heating the head of the cold-gas refrigerator by causing it to operate as a heat pump for a given time and by heating the space 3 at 100° C. to 150° C. for a few minutes, after which the cold-gas refrigerator is changed over so that it starts operating as a refrigerator. It is then found to be possible to obtain a pressure in the space 3 within a few hours, which pressure is even lower than in the case in which no heating is used.

The great advantage of the method and the device according to the invention resides in the very short time required for obtaining a very low pressure.

What is claimed is:

1. A method of attaining very low pressures while cooling an enclosed space to be degassed and utilizing a cold gas refrigerator having an expansion space comprising placing said enclosed space in thermal contact with said expansion space of said cold gas refrigerator, degassing said enclosed space to about $10^{-9}$ Torr. at a low temperature in the order of 80° K. to 15° K. transmitted by said expansion space to said enclosed space when said cold gas refrigerator is operative, providing a chamber surrounding said enclosed space, and degassing said chamber to about $10^{-4}$ Torr.

2. A method of attaining very low pressures while cooling an enclosed space to be degassed and utilizing a cold gas refrigerator having an expansion space comprising operating said cold gas refrigerator initially as a heat pump in the order of 100° C. to 150° C. whereby said expansion space is heated, placing said enclosed space in thermal contact with said expansion space of said cold gas refrigerator, degassing said enclosed space to about $10^{-9}$ Torr. at a low temperature in the order of 80° K. to 15° K. transmitted by said expansion space to said enclosed space when said cold gas refrigerator is operative, providing a chamber surrounding said enclosed space, and degassing said chamber to about $10^{-4}$ Torr.

3. A device for attaining very low pressures while cooling an enclosed space to be degassed in the order of 80° K. to 15° K. comprising a cold gas refrigerator having an expansion space provided with a wall abutting a portion of said enclosed space, a degassing means, said enclosed space being degassed to about $10^{-9}$ Torr., said portion of the enclosed space being in heat-conducting relationship with said wall, and a chamber surrounding said enclosed space adapted for being exhausted and degassed to about $10^{-4}$ Torr.

References Cited by the Examiner

UNITED STATES PATENTS

| | | | |
|---|---|---|---|
| 1,246,817 | 11/1917 | Jones | 62—268 |
| 1,890,655 | 12/1932 | O'Leary | 220—9 |
| 2,527,747 | 10/1950 | Lewis | 230—69 |
| 2,564,100 | 8/1951 | Du Pre | 62—6 |
| 2,565,722 | 8/1951 | Dawley | 165—72 |
| 2,969,092 | 1/1961 | Johnston | 138—64 |
| 3,103,108 | 9/1963 | Santeler | 62—268 |
| 3,111,074 | 11/1963 | Kermard | 62—268 |
| 3,122,896 | 3/1964 | Hickey | 62—259 |

WILLIAM J. WYE, *Primary Examiner.*